July 4, 1939.  R. E. MARBURY  2,165,065
WELDING SYSTEM
Filed Oct. 27, 1937
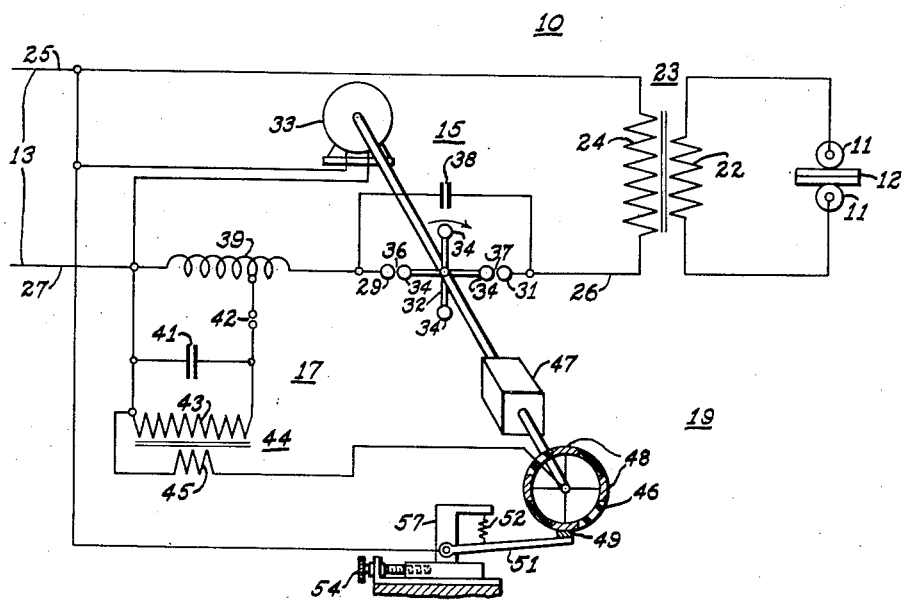
WITNESSES:
Leo? M. Garman
G. V. Giolma
INVENTOR
Ralph E. Marbury.
BY
M. Crawford
ATTORNEY Patented July 4, 1939

2,165,065

UNITED STATES PATENT OFFICE 2,165,065

WELDING SYSTEM

Ralph E. Marbury, Wilkinsburg, Pa., assignor to Westinghouse Electric & Manufacturing Company, East Pittsburgh, Pa., a corporation of Pennsylvania Application October 27, 1937, Serial No. 171,312

10 Claims. (Cl. 171—97)

My invention relates, generally, to welding, and it has particular reference to welding systems for performing spot welding operations.

In welding systems in general, and particularly in welding systems adapted for performing spot welding operations, it is often desirable to utilize exceedingly high values of welding current for relatively short periods of time. In welding together sheets of many of the high strength or corrosion resistive alloy metals, it has been found particularly advantageous to utilize intermittent spot welds, using welding currents of large values for periods of only a cycle or relatively few cycles, with intervals of one or more cycles between successive weld spots, in order to secure strong leak-proof welds without unduly heating the surrounding metal and reducing the tensile strength or corrosion resisting properties thereof.

Heretofore, mechanical switches for interrupting such high welding currents at such short and frequent intervals, have been found unsatisfactory, since the high current capacity required in these switches necessitates large current carrying parts, which seriously hinder the movement of the relatively heavy contact members, thereby preventing the opening and the closing of the welding circuit rapidly enough to produce the desired intervals of current flow. Instead, vacuum tube circuits have been developed to control the welding current in spot welding systems and afford a sufficiently accurate control thereof to conform with the requirements demanded. Such control systems, while giving exceedingly satisfactory performance, are, nevertheless, expensive to manufacture and also have the disadvantage that they require a technician with a high degree of skill to effect repairs in the event of breakdown.

It is, therefore, generally an object of my invention to provide for readily controlling the flow of welding current in a spot welding system.

More specifically, an object of my invention is to provide timing means in connection with an auxiliary high frequency control circuit for controlling the flow of current in a main load circuit in accordance with a predetermined schedule.

Another object of my invention is to provide timing means in an auxiliary high frequency circuit operatively connected with a synchronous switch in a load circuit for effecting a flow of load current for predetermined limited periods of time in the load circuit.

A further object of my invention is to provide timing means in an auxiliary control circuit operatively connected with a synchronous switch in a power circuit for impressing a high frequency breakdown voltage across the switch to effect a flow of current in the power circuit for predetermined limited intervals of time.

For a complete understanding of the nature and scope of my invention, reference may be had to the single figure of the accompanying drawing, which is a diagrammatic sketch illustrating a preferred form of my invention applied to a spot welding system.

Referring to the single figure of the drawing, the reference numeral 10 denotes generally a welding system comprising electrode rolls 11, adapted for engaging a workpiece 12 in any manner well known in the art of spot welding and disposed to be energized from an alternating-current source 13. Switch means 15 may be provided for controlling the flow of current in the welding system 10 from the source 13, while an auxiliary high frequency control circuit 17 may be connected therewith to render the switch 15 conductive when the auxiliary control circuit 17 is energized. In order to provide for energization of the high frequency control circuit 17, a timer 19, may be operatively connected with the switch 15 for connecting the control circuit to the source in timed relation with operation of the switch.

It may be seen that the electrode rolls 11 are connected in the usual manner to the secondary winding 22 of a welding transformer 23, the primary winding 24 of which is connected to be energized from the source 13, through conductors 25, 26 and 27 and switch 15.

The switch 15, which is disposed to control the flow of current in the primary winding 24, may be of any suitable construction, comprising, for example, a rotary gap having stationary contact members 29 and 31, and a rotor 32 having spaced contact members 34 disposed in operative relation with the stationary contact members 29 and 31. By connecting the rotor 32 to a driving motor 33, and causing it to be rotated thereby, the length of the air gaps 36 and 37 which separate the rotor contact members 34 from the stationary contact members 29 and 31, respectively, may be varied periodically. Furthermore, by associating the motor 33 in connection with the source 13, the gaps 36 and 37 may be varied in synchronism with the pulsations of the current from the source 13. A condenser 38 is connected in shunt circuit relation with the switch 15 for a purpose hereinafter set forth.

An inductance 39 may be disposed in series circuit relation with the source 13 and the switch means 15 for permitting the high frequency control circuit 17, when energized, to apply a high frequency "breakdown" voltage across the gaps 36 and 37 of the switch means 15. The high frequency control circuit 17 may, as shown, comprise a condenser 41 and a spark gap 42 connected in series circuit relation across the inductance 39 to provide a resonant circuit. The secondary winding 43 of an auxiliary control transformer 44 may be connected in shunt circuit relation across the condenser 41, while its primary winding 45 is connected with the source 13 through the timer 19, for energizing the high frequency control circuit.

In order to permit energization of the high frequency control circuit at the desired intervals, the timer 19 may comprise generally a rotor 46, disposed to be operatively connected with the switch 15 through speed changing means 47 of any well known type and having conductive commutator segments 48 mounted thereupon in peripheral spaced relation for engagement with a contact brush 49. The brush 49 may be disposed in engagement with the rotor 46 in any suitable manner, being, for instance, mounted on a pivotal arm 51 and biased into engagement with the segments 48 by means of a spring 52. Provision is made for slidably adjusting the brush 49 to alter its relative position of contact with the periphery of the rotor 46 by means of a thumb screw 54 which engages the brush arm support 57.

The operation of the system is as follows. When the high frequency control circuit 17 is deenergized, the welding circuit 10 will also normally be deenergized, as its connection with the source 13 is interrupted at the gaps 36 and 37 of the switch means 15. By driving the rotor 32 of the switch means 15 in synchronism with the current pulsations of the source 13, and operatively connecting the rotor 46 of the timer 19 thereto by means of an adjustable connection, such as the speed changer 47, it is possible, through adjustment of the timer brush 49 by the thumb screw 54, to energize the high frequency control circuit 17 in timed relation with the movement of the rotor 32 of the switch means 15. If the high frequency control circuit 17 is energized with the rotor 32 in substantially the position shown in the drawing, the high frequency control circuit will cause a high frequency potential to be applied across the gaps 36 and 37 of the switch means 15, "breaking" them down and permitting current to flow from the source 13 through the primary winding 24 of the welding transformer 23, thereby energizing the secondary winding 22 and the electrode rolls 11. Through adjustment of the contact brush 49, the high frequency control circuit may be energized for other relative positions of the switch rotor contact members 34 and the stationary contact members 29 and 31. Since energization of the high frequency control circuit 17 is necessary to "break down" the gaps 36 and 37 to initiate the flow of current across these gaps, and rotation of the rotor 32 past the position shown in the drawing lengthens the gaps and interrupts any flow of current thereacross, by connecting the timer rotor 46 and the switch rotor 32 in adjustable relation and driving them in synchronism with current pulsations of the source 13, the flow of welding current across the gaps 36 and 37 may be interrupted or initiated as desired. The condenser 38 is disposed to assist in interrupting the flow of current across the gaps 36 and 37 as the rotor contact members 34 and the stationary contact members 29 and 31 separate, in a manner well known in the art of arc suppression in connection with contact breaking devices.

Accordingly, by varying the position of the contact brush 49 with relation to the timer rotor 46, the time of initiation of the arc may be varied. By varying the speed of the timer rotor 46 relative to the switch rotor 32, it may be seen that the duration of the energization of the high frequency control circuit may be varied. A wide range of periodic energizations and deenergizations of the welding transformer 23 may, therefore, be secured by varying the brush position and timer speed, thereby permitting a ready control of the flow of welding current between the electrode rolls 11 in accordance with the conditions found necessary when welding metals of different properties.

It may, therefore, be seen that in my invention I have provided simple means for readily controlling the flow of current in a welding circuit. By utilizing synchronously operated timing means, operatively connected with the welding circuit switch for controlling an auxiliary control circuit, I am able to readily vary the duration and sequences of the welding operations by means of equipment which is simple, economical to manufacture, and easy to maintain.

Since certain changes may be made in the above construction, and different embodiments of the invention may be made without departing from the spirit thereof, it is intended that all the matter contained herein or shown in the accompanying drawing shall be considered as illustrative, and not in a limiting sense.

I claim as my invention:

1. The combination in a power system, of a source of power, a load circuit adapted to be energized from the source, means for periodically controlling association of the load circuit and the source, and timing means operatively connected with said means to render said means conductive and effect energizations of the load circuit for predetermined periods of time.

2. In a control system, in combination, a source of power, a load circuit, control means for periodically associating the source and load circuit, and means including a switch and an auxiliary high frequency control circuit energizable from the source cooperative to render the control means conductive for energizing the circuit from the source for predetermined periods of time, said control means being effective to effect deenergization of the circuit at current zero.

3. In a power system, in combination, a source of power, a load circuit adapted to be energized from the source, control means for providing a periodically varying gap between the circuit and the source, and control means comprising an auxiliary high frequency control circuit and a timing device disposed in timed operating relation with the control means to periodically render the gap conductive and connect the load circuit to the source for predetermined intervals of time.

4. A control system, comprising, a source of power, a load circuit disposed to be energized from the source, control means operable to control the association of the load circuit and the source, an auxiliary control circuit disposed in connection with the control means for rendering it conductive, and timing means operatively connected to the control means to energize the auxiliary circuit to effect energization of the load circuit for variable predetermined periods of time, said control means being operable to effect periodic interruption of the load current.

5. A power system comprising, an alternating-current source of power, a load circuit disposed to be energized from the source, a synchronous control switch for controlling the load circuit, an auxiliary high frequency control circuit energizable to apply a breakdown potential across said control switch, and timing means for energizing said auxiliary circuit at definite predetermined times, said timing means being connected in variable timed operating relation with said switch to permit energization of the load circuit for repeated predetermined variable periods of time.

6. In a control system, in combination, a source of power, a load circuit disposed to be energized from the source, control means for providing a periodically varying gap between the load circuit and the source for controlling the load circuit, an auxiliary high frequency control circuit disposed in connection with said control means for rendering the gap of said control means conductive, and adjustable timing means for periodically energizing and deenergizing the auxiliary circuit, said timing means being connected for operation in timed relation with said gap for energizing the auxiliary circuit to permit repeated energization of the load circuit for definite predetermined periods of time at definite predetermined intervals.

7. A control system for a load circuit, comprising, a source of power, a load circuit, a transformer having a secondary winding for connection with the load circuit and a primary winding disposed to be energized from the source, switch means for providing a periodically varying control gap in series with said primary winding, a high frequency control circuit connected for applying an ionizing potential across said gap to render it conductive, timing means operatively connected with said switch means for energizing the control circuit, whereby the load circuit may be energized for predetermined definite periods of time, said switch means being disposed to effect periodic deenergization of the load circuit at current zero.

8. A power system comprising, a power source, a transformer having primary and secondary windings, a load circuit connected with the secondary winding, a synchronous switch device disposed between the primary winding and the source, an auxiliary high frequency control circuit disposed in connection with said switch, and an adjustable timing device operatively connected with the switch device for connecting the control circuit to the source, whereby the switch device is rendered conductive to energize the load circuit for predetermined definite periods of time.

9. A control system comprising, an alternating-current power source, a load circuit adapted to be energized from the source, synchronous switch means disposed to control the load circuit, an inductance disposed in series circuit relation with said means, auxiliary circuit means including a condenser and a gap connected in shunt relation with said inductance to provide a resonant control circuit, and adjustable timing means operatively connected in synchronism with said switch means for connecting said auxiliary circuit means to the source to render said switch means conductive, thereby energizing the load circuit for predetermined variable periods of time, said switch means being effective to periodically deenergize the load circuit.

10. In combination in a control system, a source of power, a transformer having a primary winding disposed to be energized from the source and secondary winding disposed in connection with a load circuit, rotary switch means for providing a periodically varying gap in series circuit relation with the primary winding, a resonant control circuit in connection with the rotary switch for applying a high frequency control potential thereto to render the rotary switch conductive, synchronous timing means connected in adjustable relation with the rotary switch for energizing the control circuit for predetermined variable periods of time, thereby connecting the primary winding to the source, and condenser means disposed in shunt relation with the rotary switch to permit rapid cessation of current flow in the load circuit when the control circuit is deenergized.

RALPH E. MARBURY.